(12) United States Patent
Gardner

(10) Patent No.: US 9,212,752 B2
(45) Date of Patent: Dec. 15, 2015

(54) GAS BYPASS DEVICE

(71) Applicant: Jordan Gardner, Woodbury, MN (US)

(72) Inventor: Jordan Gardner, Woodbury, MN (US)

( * ) Notice: Subject to any disclaimer, the term of this patent is extended or adjusted under 35 U.S.C. 154(b) by 0 days.

(21) Appl. No.: 13/834,711

(22) Filed: Mar. 15, 2013

(65) Prior Publication Data

US 2013/0263951 A1 Oct. 10, 2013

Related U.S. Application Data

(60) Provisional application No. 61/685,782, filed on Mar. 26, 2012.

(51) Int. Cl.
| | |
|---|---|
| *F16K 5/06* | (2006.01) |
| *F16K 11/087* | (2006.01) |
| *F16K 1/42* | (2006.01) |
| *G01F 15/18* | (2006.01) |
| *G01F 15/00* | (2006.01) |
| *F16K 11/085* | (2006.01) |
| *F16K 11/076* | (2006.01) |
| *F16K 5/20* | (2006.01) |
| *F16K 11/20* | (2006.01) |

(52) U.S. Cl.
CPC ............ *F16K 11/0873* (2013.01); *F16K 1/427* (2013.01); *F16K 5/0605* (2013.01); *F16K 5/0668* (2013.01); *F16K 5/0689* (2013.01); *F16K 5/202* (2013.01); *F16K 11/076* (2013.01); *F16K 11/087* (2013.01); *F16K 11/0853* (2013.01); *F16K 11/20* (2013.01); *G01F 15/005* (2013.01); *G01F 15/185* (2013.01); *Y10T 137/0413* (2015.04); *Y10T 137/5997* (2015.04); *Y10T 137/86501* (2015.04); *Y10T 137/86726* (2015.04); *Y10T 137/86831* (2015.04); *Y10T 137/87354* (2015.04)

(58) Field of Classification Search
CPC . G01F 15/185; G01F 15/005; F16K 11/0873; F16K 11/0853; F16K 11/076; F16K 5/0605; F16K 5/0668; F16K 5/0689; F16K 1/427; F16K 5/202; Y10T 137/86726; Y10T 137/86831; Y10T 137/87354; Y10T 137/5997; Y10T 137/0413
USPC .................. 137/315.06, 599.13, 229, 15.03, 137/625.42, 625.29
See application file for complete search history.

(56) References Cited

U.S. PATENT DOCUMENTS

| | | | | |
|---|---|---|---|---|
| 2,240,223 | A | * | 4/1941 | Marie Muselier Bernard Gabriel ........................... 73/201 |
| 3,256,735 | A | * | 6/1966 | Smith .............................. 73/201 |
| 3,296,861 | A | * | 1/1967 | Mueller et al. .................. 73/201 |
| 3,915,437 | A | * | 10/1975 | Lammers et al. .............. 366/140 |
| 4,516,596 | A | * | 5/1985 | Sugisawa et al. .............. 137/240 |
| 4,660,591 | A | * | 4/1987 | Brown et al. ................. 137/312 |
| 7,347,219 | B2 | | 3/2008 | Gohde et al. |
| 2012/0193558 | A1 | * | 8/2012 | Hoots et al. ...................... 251/89 |

\* cited by examiner

*Primary Examiner* — Atif Chaudry
(74) *Attorney, Agent, or Firm* — Kinney & Lange, P.A.

(57) ABSTRACT

A bypass device used in conjunction with a gas meter has a normal mode and a bypass mode. In the normal mode, the bypass device routes gas through the gas meter to a customer. In the bypass mode, the bypass device routes gas through a bypass path so that the gas meter can be serviced or replaced without interrupting gas service to the customer. Manual operating ball valves select either the normal mode or the bypass mode. Each ball valve includes a rotatable diverter ball with a 90° flow passage. Each diverter ball is mounted within the bypass device between pair of polymer annular valve seats.

9 Claims, 10 Drawing Sheets

GAS BYPASS DEVICE

CROSS-REFERENCE TO RELATED APPLICATION

This application claims benefit of U.S. patent application Ser. No. 61/685,782, entitled "VANN GROUP GAS BYPASS SYSTEM" filed Mar. 26, 2012, and is incorporated by reference herein.

BACKGROUND

This invention relates to a bypass device for by passing a gas meter that needs to be serviced or replaced without interrupting gas service to a customer.

When a gas meter requires service or replacement, a service person from the gas utility company must typically make an appointment with the customer, because the service or replacement of the meter requires that gas service be turned off to the customer. This is particularly problematic with residential customers. If the customer is not home, the service or replacement cannot be performed because turning off the gas could result in water pipes freezing and a loss of heat in the home. On some occasions, the service personnel may have to go to the customer's premises multiple times and leave a tag on the door until the customer finally calls to set up an appointment. Often times the appointment is set up in the evening, which means that the service personnel must be paid overtime.

One solution to this problem is the temporary or permanent installation of some form of bypass system that allows gas meter to be serviced or repaired without shutting off gas to the customer. One form of bypass system makes use of a meter bar that is permanently installed with the meter. Normally, the meter bar routes gas through the meter to the customer. If service or replacement of the meter is required, the meter bar provides a bypass path through which the gas flows. The gas meter is bypassed so that it can be serviced or replaced without interrupting the gas service to the customer. One example of a meter bar that function as a bypass system for a gas meter is shown in U.S. Pat. No. 7,347,219.

In the past, permanently installed meter bar bypass systems have not been widely accepted. The problems have been encountered with valves of the meter bar bypass system, which are sealed with grease and rubber O-rings. In the northern United States, temperatures can range from −40° F. in the winter to over 100° F. in the summer. With these temperature extremes, the grease used to lubricate and seal valves in a meter bar has a tendency to dry up and crack, and O-rings have a tendency to tighten up, harden, and crack. As a result, leaks at the valves of the meter bar can occur.

Leaking valves on a bypass system for a gas meter are not acceptable. If leaks occur, not only does the leaking metering bar need to be removed or replaced, but other similar devices from the same lot may also need to be replaced at the same time. Thus, unreliability of a meter bar bypass system can have a significant economic impact to the gas utility company that has installed those devices.

SUMMARY

A gas bypass device for use in conjunction with a gas meter has a normal mode in which natural gas is routed through the gas meter and a bypass mode in which gas meter is by passed so that it can be serviced or replaced without interrupting gas service to a customer. Selection of the normal mode or the bypass mode is provided by a pair of ball valves. Each ball valve includes a rotatable ball diverter with a 90° flow passage located within a valve chamber in the device. Each rotatable ball diverter is sealed within the valve chamber by a pair of polymer annular valve seats.

DETAILED DESCRIPTION

Figure 1:
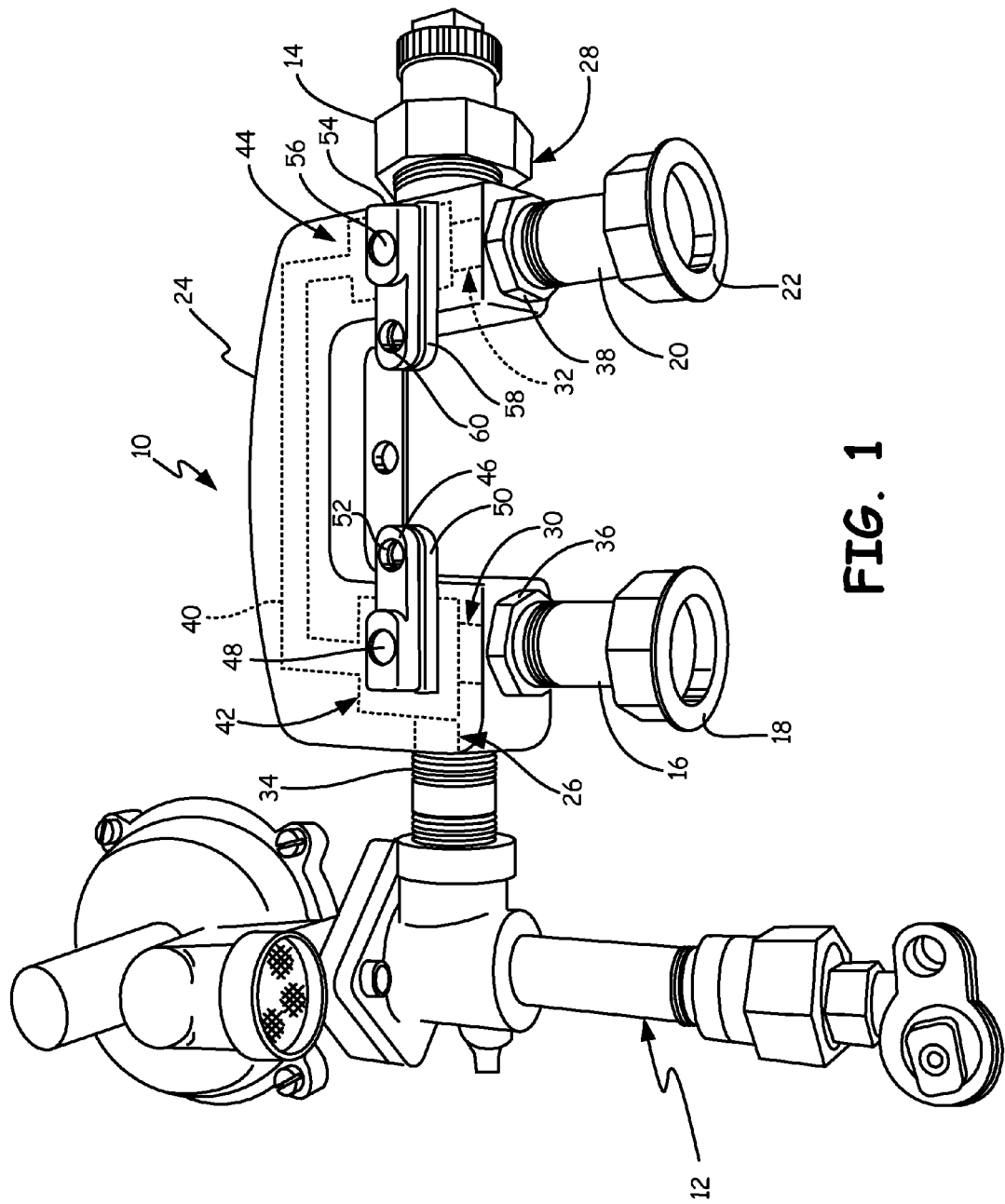
FIG. 1 is a perspective view showing a gas bypass device attached to a gas supply line.

FIG. 1 shows gas bypass device 10 connected to gas supply line 12 and to customer gas fitting 14. Also shown are gas meter inlet pipe 16 and inlet fitting 18 and gas meter outlet pipe 20 and fitting 22. Gas bypass device 10 normally routes gas through a gas meter (not shown) connected to pipes 16 and 20 and then to a customer. When the gas meter needs to be serviced or replaced, bypass device 10 provides a bypass path for gas to the customer, so that the gas meter can be serviced or replaced without interrupting gas service to the customer.

Bypass device 10 includes bypass body 24, which in the embodiment shown has a U-shape. Body 24 includes gas inlet port 26, gas outlet port 28, meter inlet port 30 and meter outlet port 32. Inlet port 26 is internally threaded, and receives threaded end 34 of supply line 12. Gas outlet port 28 is externally threaded. Fitting 14 is threaded on to outlet port 28, and provides connection of gas to the customer.

Meter inlet port 30 is internally threaded, and receives end cap 36. Pipe 16 is threaded into end cap 36. Meter outlet port 32 is internally threaded, and receives threaded end cap 38. Pipe 20 is threaded into end cap 38.

Bypass body 24 includes internal bypass passage 40 through which gas is routed when the gas meter requires service or replacement. Control of gas flow through either the gas meter or through bypass passage 40 is provided by inlet ball valve 42 and outlet ball valve 44. Inlet ball valve 42 has a normal position in which gas entering bypass body 24 through inlet port 26 is directed through inlet ball valve 42 to meter inlet port 30. The gas then flows through pipe 16 and fitting 18 into the gas meter. In the bypass position, inlet ball valve 42 blocks meter inlet port 30 and directs flow of gas from supply inlet port 26 to bypass passage 40.

In the normal operating position, outlet ball valve 44 routes gas received at meter outlet port 32 to gas outlet port 28. In the bypass position, outlet ball valve 44 blocks meter outlet port 32 and connects bypass passage 40 to customer outlet port 28.

The position of inlet ball valve 42 is controlled by inlet (left) handle 46 and stem 48. Handle 46 is rotatable through 90° from the normal position shown in FIG. 1 to the bypass position in which the outer end of handle 46 is rotated downward into alignment with meter inlet port 30. Handle 46 is mounted on handle mount 50, which is a part of and protrudes from the front face of bypass body 24. Locking hole 52 in handle 46 aligns with a similar locking hole in handle mount 50 so that a paddle lock or other locking device can maintain ball valve 42 in the normal position unless the lock is removed.

The position of outlet ball valve 44 is controlled by handle 54 and stem 56. In FIG. 1, handle 54 is aligned with handle mount 58, and locking hole 60 of handle 54 is aligned with a similar locking hole in mount 58. This allows outlet ball valve 44 to be locked in the normal position.

The ability to lock valves 42 and 44 prevents an unauthorized person from bypassing the meter and obtaining gas without having to pay for it.

Figure 2:
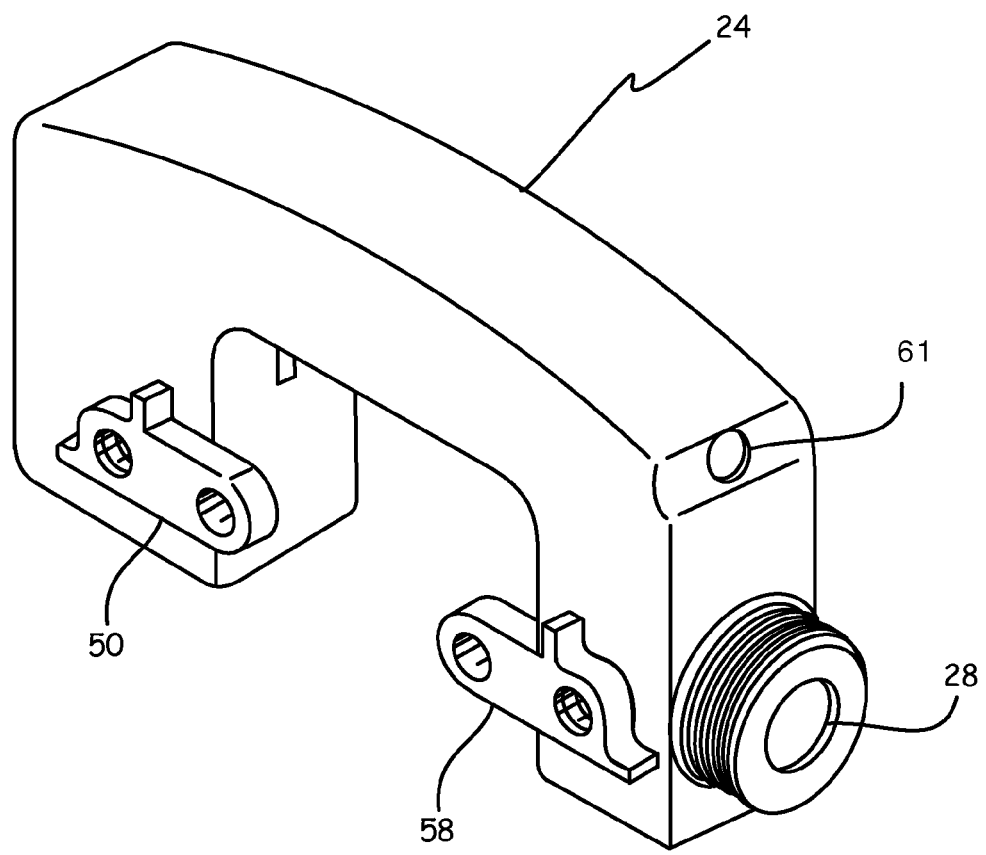
FIG. 2 shows an isometric view of a body of the bypass device of FIG. 1.

FIG. 2 is an isometric view of bypass body 24. In this view, customer outlet port 28 and handle mounts 50 and 58 can be seen. Also shown in FIG. 2 is gauge port fitting 61, which allows access to bypass passage 40 in order to control the flow rate of gas through bypass passage 40 when the gas meter is bypassed.

Figure 2A:
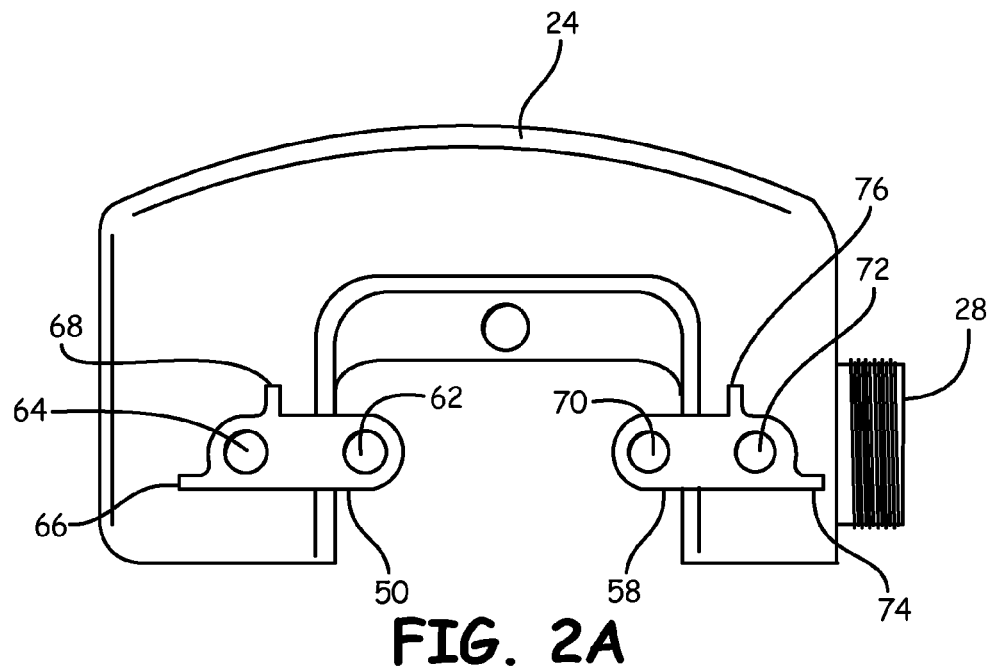
FIGS. 2A-2E show front, top, bottom, left side, and right side views of the bypass body of FIG. 2.
Figure 2B:
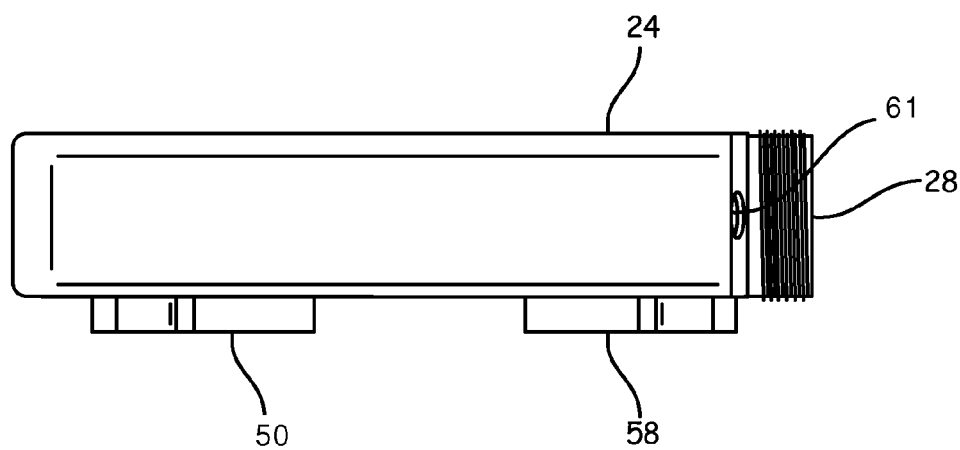

FIGS. 2A-2E are front, top, bottom, left side and right side views of bypass body 24, respectively. In FIG. 2A, further details regarding handle mounts 50 and 58 can be seen. Handle mount 50 includes locking hole 62, stem bore 64, and rotation stops 66 and 68. Similarly, handle mount 58 includes locking hole 70, stem bore 72, and rotation stops 74 and 76.

Figure 2C:
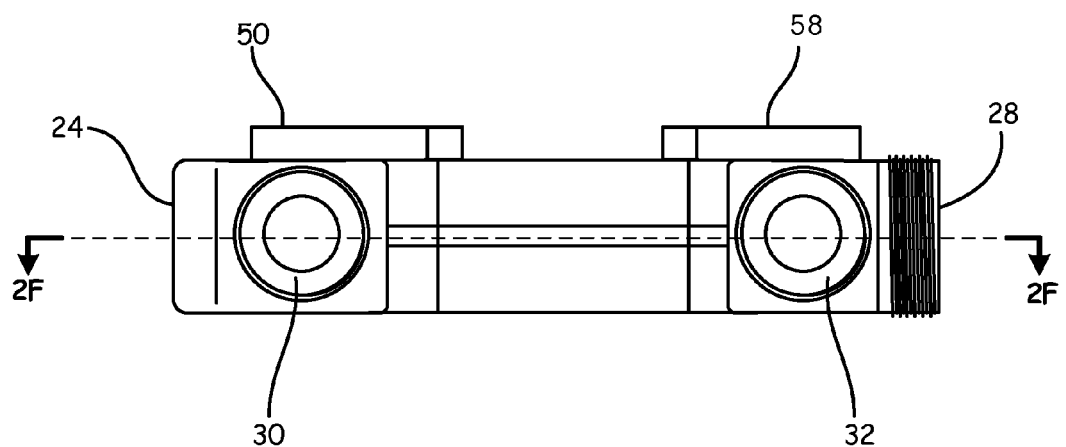
Figure 2D:
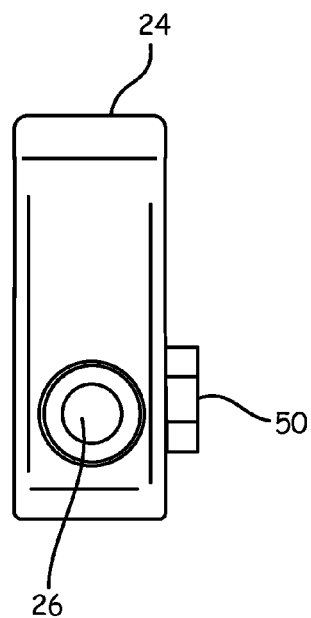
Figure 2E:
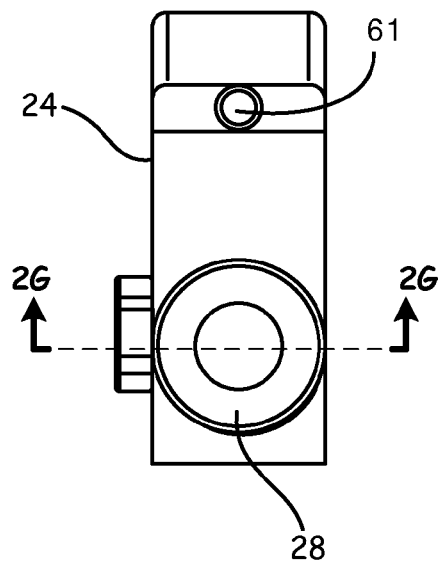
Figure 2F:
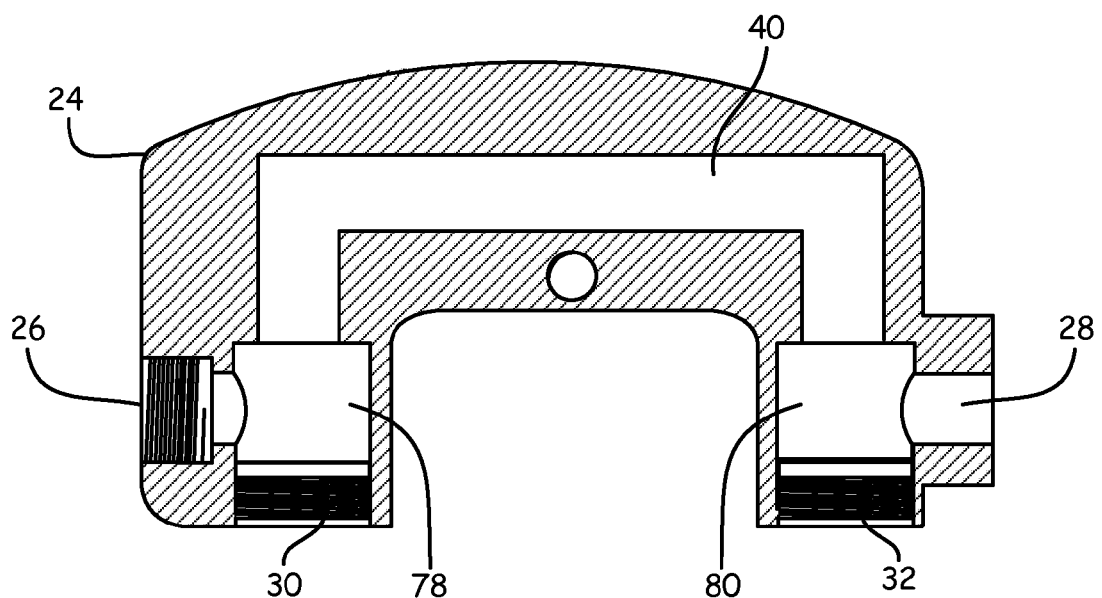
FIG. 2F is a sectional view of the bypass body along section 2F-2F of FIG. 2C.

FIG. 2F is a cross-section of bypass body 24 taken along section 2F-2F in FIG. 2C. In FIG. 2F, ports 26, 28, 30, and 32 can be seen, along with bypass passage 40. At the intersection of ports 26 and 30 and the inlet end of bypass passage 40 is inlet valve chamber 78. Similarly, outlet valve chamber 80 is located at the intersection of the outlet end of bypass passage 40, and ports 28 and 32. Within inlet valve chamber 78, diverter ball 86 (FIG. 3A) and two polymer annular valve seats 98 (FIG. 4) are located. Within outlet valve chamber 80, diverter ball 92 (FIG. 3B) and two polymer annular valve seats 98 are located.

Figure 2G:
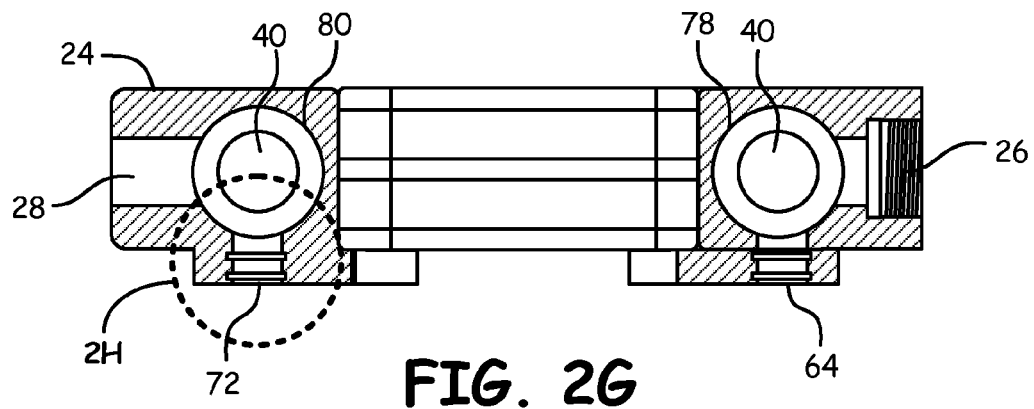
FIG. 2G is a sectional view along section 2G-2G of FIG. 2E.

FIG. 2G is a sectional view of body 24 taken along section 2G-2G of FIG. 2E. In FIG. 2G, valve chambers 78 and 80 can be seen. Also shown in FIG. 2G are stem bores 64 and 72, which intersect valve chambers 78 and 80, respectively. Stem bores 64 and 72 receive stems 48 and 56, which connect handles 46 and 54, respectively, to the diverter balls within chambers 78 and 80.

Figure 2H:
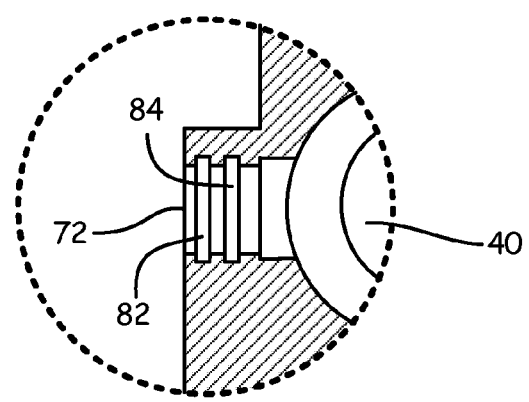
FIG. 2H is a detail view of detail 2H shown in FIG. 2G.

FIG. 2H shows further detail of stem bore 72. Two PTFE coated O-rings 82 and 84 are located within stem bore 72 to seal around stem 56. A similar O-ring arrangement is provided in stem bore 64.

Figure 3A:
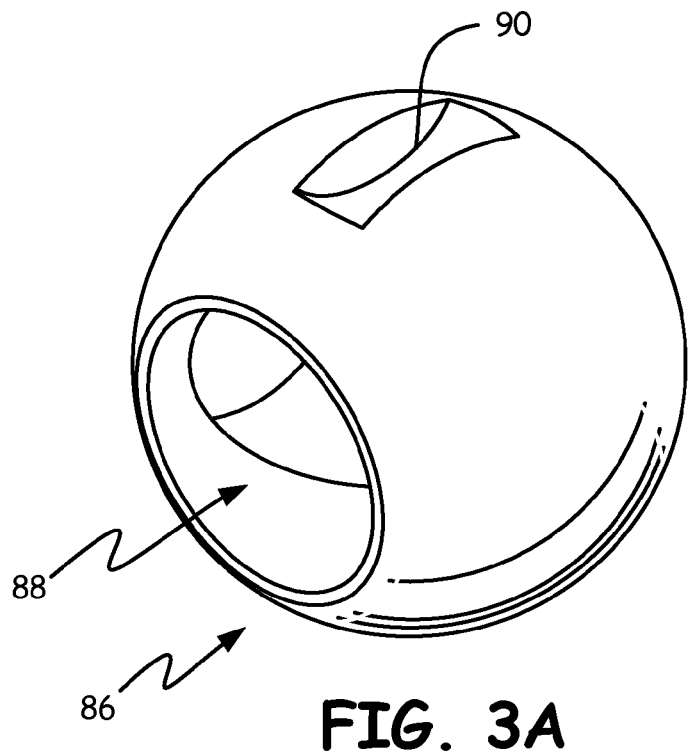
FIGS. 3A and 3B are isometric views of a ball diverter.

FIG. 3A shows inlet diverter ball 86, which is located in inlet valve chamber 78. Inlet diverter ball 86 includes 90° passage 88 and slot 90. Depending on the orientation of ball 86, passage 88 will connect gas inlet port 26 to either meter inlet port 30 or to the inlet end of bypass passage 40. The rotational position of diverter ball 86 is controlled by the position of handle 46 through stem 48. The inner end of stem 48 engages slot 90 to translate rotation of handle 46 into rotation of diverter ball 86.

Figure 3B:
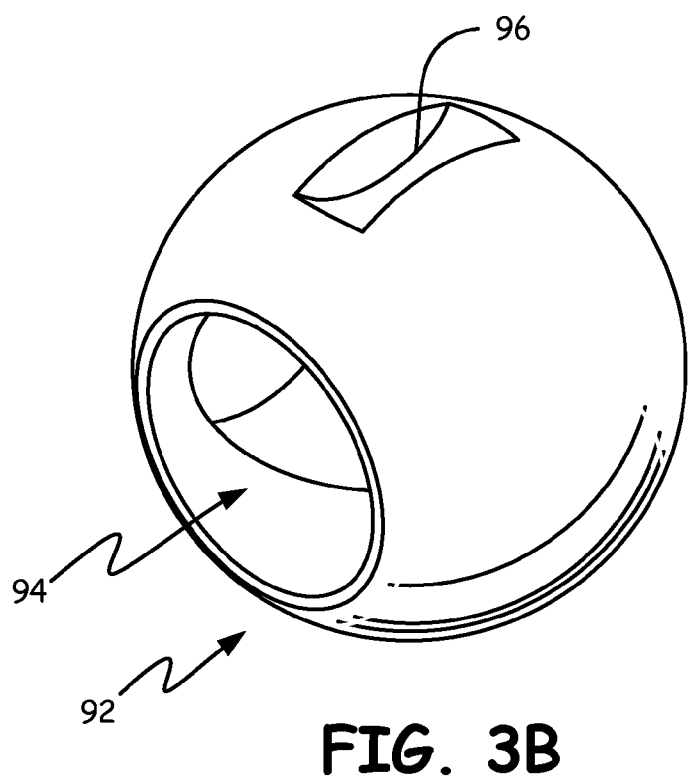

FIG. 3B shows outlet diverter ball 92, which includes 90° passage 94 and slot 96. Outlet diverter ball 92 is positioned in outlet valve chamber 80. Depending on the rotational position of diverter ball 92, gas outlet port 28 is connected to either meter outlet port 32 or to the outlet end of bypass passage 40. The position of diverter ball 92 is controlled by the position of handle 54 through stem 56. The inner end of stem 56 is shaped to engage slot 96 of diverter ball 92.

Each diverter ball 86 and 92 is held in position within its respective valve chamber 78, 80 by a pair of polymer annular valve seats 98. Valve seats 98 are preferably made of polytetrafluoroethylene (PTFE), which provides low friction and excellent sealing characteristics over a wide temperature range.

Figure 4:
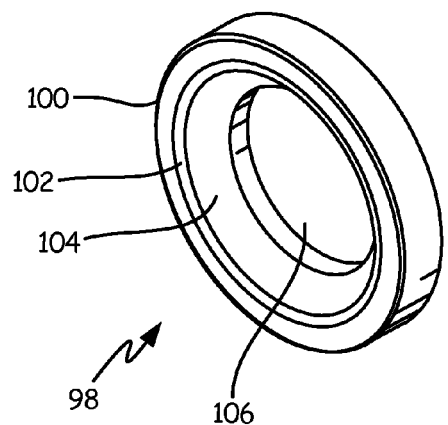
FIG. 4 is an isometric view of a polymer annular valve seat.

FIG. 4 shows valve seat 98, which is representative of all four of the valve seats used in bypass device 10. As shown in FIG. 4, valve seat 98 includes outer rim 100, conical sections 102 and 104, and central opening 106. Conical sections 102 and 104 face an engage diverter ball 86 or 92.

When installed, one valve seat will be located within valve chamber 78 adjacent the inlet end of bypass passage 40. The other valve seat will be positioned at meter inlet port 30, and will be held in position by end cap 36. The two valve seats face one another and capture diverter ball 86 between them.

In valve chamber 80, one valve seat will be positioned adjacent the outlet end of bypass passage 40, and the other will be held in place by end cap 38 at meter outlet port 32. The two valve seats face one another and capture diverter ball 92 between them.

Figure 5:
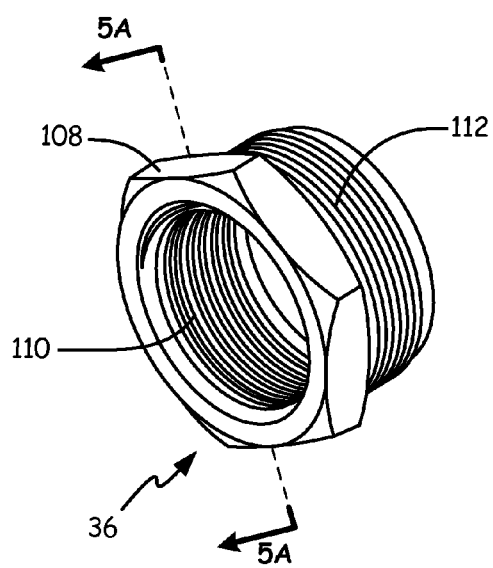
FIG. 5 is an isometric view of an end cap.
Figure 5A:
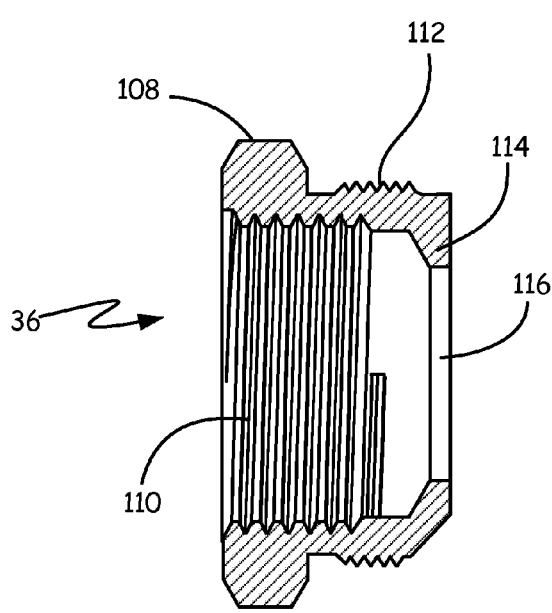
FIG. 5A is a sectional view of the end cap of FIG. 5.

FIG. 5 shows end cap 36, which includes hex outer end 108, internal threads 110, external threads 112, and inner end 114 with passage 116. When end cap 36 is threaded in to meter inlet port 30, it applies pressure to valve seat 98 positioned at meter inlet port 30. Passage 116 of end cap 36 aligns with central passage 106 of valve seat 98. End cap 38 is identical to end cap 36 shown in FIGS. 5 and 5A.

Figure 6A:
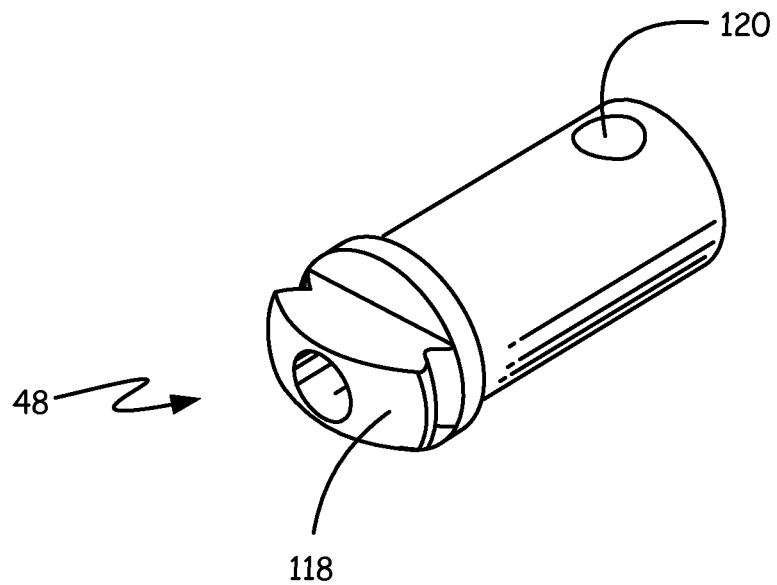
FIGS. 6A and 6B are isometric views of inlet and outlet valve stems, respectively.

FIG. 6A shows inlet stem 48, which connects handle 46 to diverter ball 86. At its inner end, inlet stem 48 includes tongue 118, which fits into slot 90 of inlet diverter ball 86. Pin alignment hole 120 is located at the outer end of tongue 118 and is oriented at 90° to the orientation of tongue 118. This relationship of tongue 118 and alignment hole 120 assures that inlet ball diverter 86 will have the proper orientation within inlet valve housing 78.

Figure 6B:
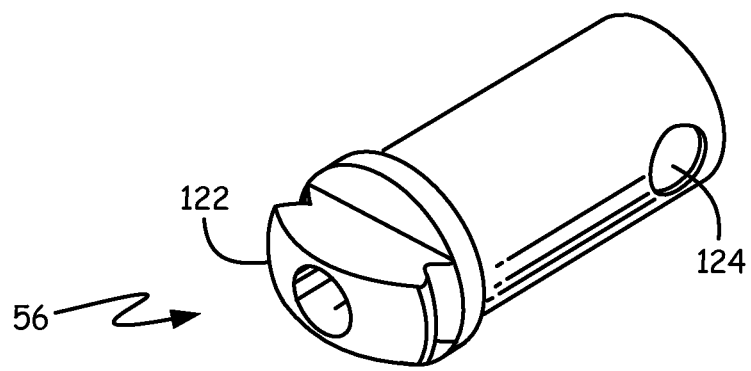

FIG. 6B shows outlet stem 56 which has tongue 122 at its inner end and alignment hole 124 near its outer end. In contrast to inlet stem 48, tongue 122 and alignment hole 124 of outlet stem 56 are aligned parallel to one another. The arrangement of tongue 122 and alignment hole 124 ensures that outlet diverter ball 92 will be properly oriented within valve chamber 80. The different alignments of stems 48 and 56 are necessary because handles 46 and 54 are rotated in opposite directions when they are moved from the normal position to the bypass position. Inlet handle 46 rotates in a clockwise direction, while outlet handle 54 rotates in a counterclockwise direction.

Figure 7A:
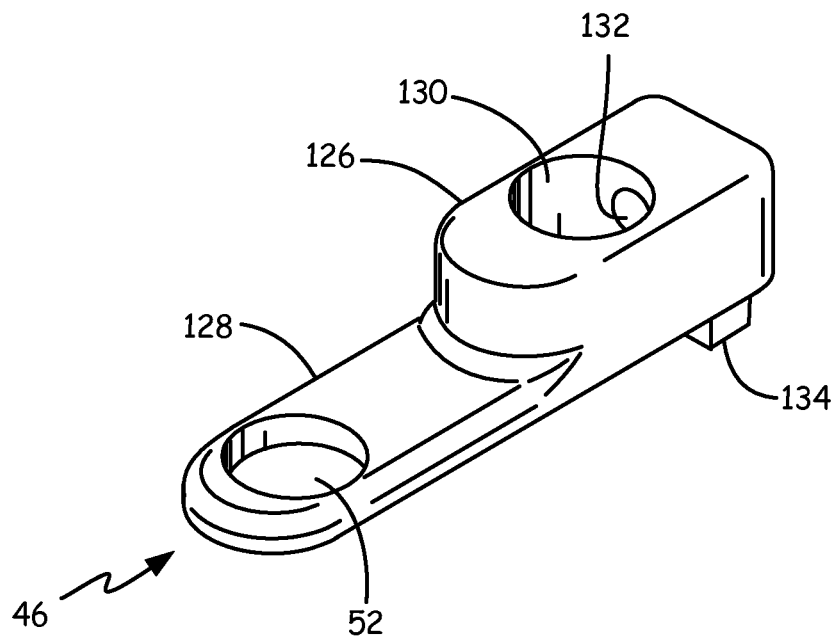
FIGS. 7A and 7B are isometric views of inlet and outlet handles, respectively.
Figure 7B:
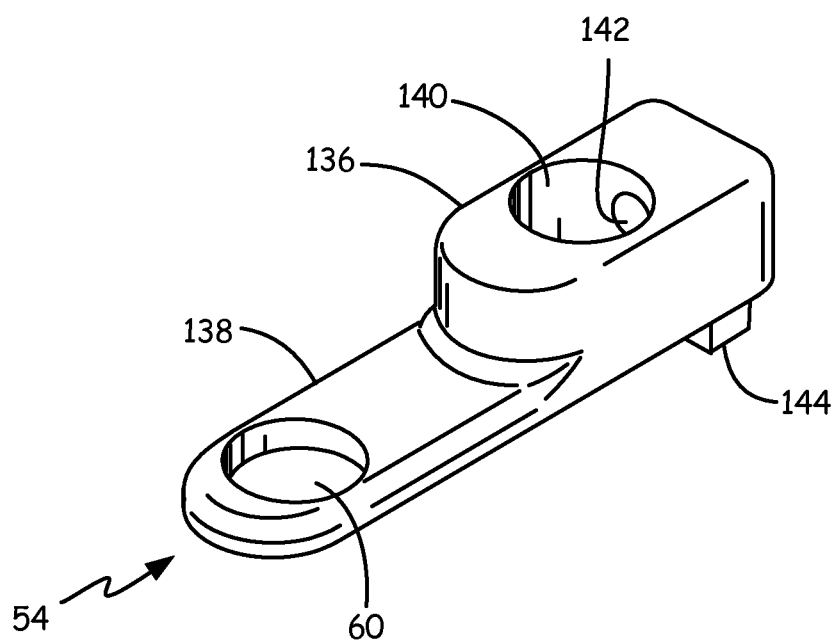

FIGS. 7A and 7B show handles 46 and 54, respectively. Although generally of similar shape, inlet handle 46 is, in one embodiment, slightly longer than outlet handle 54. Handles 46 and 54, as well as stems 48 and 56 can be labeled so that the correct stem handle, and ball diverter are connected to one another.

Inlet handle 46 shown in FIG. 7A includes handle body 126, handle arm 128, stem bore 130, alignment hole 132, and stop tab 134. Also shown in FIG. 7A is locking hole 52.

The outer end of inlet stem 48 is received in stem bore 130. Hole 120 in inlet stem 48 is aligned with hole 132 in inlet handle 46, and a pin or set screw is inserted to connect inlet handle 46 to the outer end of inlet stem 48. Tab 134 projects below handle body 126. When handle 46 is rotated in a counterclockwise direction, tab 134 engages stop 66 on handle mount 50 (FIG. 2A). This defines the normal position of inlet valve 42 in which gas is routed through the gas meter. Rotating inlet handle 46 in a clockwise direction will move inlet valve 42 to the bypass position, which is defined when tab 134 engages stop 68 of handle mount 50 (FIG. 2A).

Outlet handle 54 is shown in FIG. 7B. It includes handle body 136, arm 138, stem bore 140, alignment passage 142, tab 144, and locking hole 60.

Outlet handle 54 is connected to the upper end of outlet stem 56 by aligning hole 124 of outlet stem 56 with hole 142 of outlet handle 54. A pin or set screw is used to hold outlet stem 56 and outlet handle 54 together.

Tab 144 engages stop 74 of handle mount 58 when outlet handle 54 is in the normal position. When outlet handle 54 is rotated in the counterclockwise direction, tab 144 will engage stop 76 of handle mount 58 when outlet valve 44 reaches the bypass position.

Bypass device 10 provides reliable operation over a wide range of environmental conditions. The use of ball valves which a diverter ball is seated between a pair of annular PTFE valve seats provides reliable sealing of gas passages and avoids the problems encountered with other valve mechanisms used in bypass devices.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bypass device comprising:
   a housing having a gas inlet port, a meter inlet port, a gas outlet port, a meter outlet port, a bypass passage extending between a bypass inlet and a bypass outlet, an inlet valve chamber located at an intersection of the gas inlet port, the meter inlet port and the bypass inlet, an outlet valve chamber located at an intersection of the gas outlet port, the meter outlet port, and the bypass outlet;
   wherein the meter inlet port and the bypass inlet are positioned opposite one another across the inlet valve chamber and the gas inlet port is located at 90° from each of the meter inlet port and the bypass inlet, and wherein the meter outlet port and the bypass outlet are positioned opposite one another across the outlet valve chamber and the gas outlet port is located at 90° from each of the meter outlet port and the bypass outlet;
   an inlet diverter ball positioned in the inlet valve chamber and having a 90° inlet flow passage with two openings, wherein the two openings in the inlet flow passage can be oriented to allow flow from the gas inlet port to the meter inlet port or to allow flow from the gas inlet port to the bypass inlet;
   a first polymer annular inlet valve seat located adjacent to and having a center bore aligned with the bypass inlet to provide a seal between the inlet diverter ball and a portion of the housing surrounding the bypass inlet;
   a second polymer annular inlet valve seat located adjacent a first end cap mounted in the meter inlet port and having a center bore aligned with a passage in the first end cap to provide a seal between the inlet diverter ball and the first end cap mounted in the meter inlet port;
   an inlet control handle connected to rotate the inlet diverter ball by 90° between a meter inlet position in which the 90° inlet flow passage connects the gas inlet port and the meter inlet port and the inlet diverter ball blocks the bypass inlet, and a bypass inlet position in which the 90° inlet flow passage connects the gas inlet port and the bypass inlet and the inlet diverter ball blocks the meter inlet port;
   an outlet diverter ball positioned in the outlet valve chamber and having a 90° outlet flow passage with two openings, wherein the two openings in the outlet flow passage can be oriented to allow flow from the meter outlet port to the gas outlet port or to allow flow from the bypass outlet to the gas outlet port;
   a first polymer annular outlet valve seat located adjacent the bypass outlet and having a center bore along with the bypass inlet to provide a seal between the outlet diverter ball and a portion of the housing surrounding the bypass outlet;
   a second polymer annular outlet valve seat located adjacent a second end cap mounted in the meter outlet port and having a center bore aligned with a passage in the second end cap to provide a seal between the outlet diverter ball and the second end cap;
   an outlet control handle connected to rotate the outlet diverter ball by 90° between a meter outlet position in which the 90° outlet flow passage connects the gas outlet port and the meter outlet port and the outlet diverter ball blocks the bypass outlet, and a bypass outlet position in which the 90° outlet flow passage connects the gas outlet port and the bypass outlet and the outlet diverter ball blocks the meter outlet port;
   wherein the first and second polymer annular inlet valve seats and the first and second polymer annular outlet valve seats are made of polytetrafluoroethylene;
   wherein the inlet diverter ball is engaged by and held between the first and second polymer annular inlet valve seats; and
   wherein the outlet diverter ball is engaged by and held between the first and second polymer annular outlet valve seats; and wherein, each of the polymer annular inlet valve seats and each of the polymer annular outlet valve seats comprises a polytetrafluoroethylene ring having a flat rear surface with a circular center bore extending between the front surface and the rear surface, the front surface including an outer rim section, a first conical section extending radially inward from the rim section toward the center bore, and a second conical section extending radially inward from the first conical section to the center bore.

2. The gas bypass device of claim 1, wherein the inlet control handle is rotatable 90° in a clockwise direction from the meter inlet position to the bypass inlet position, and the outlet control handle is rotatable 90° in a counterclockwise direction from the meter outlet position to the bypass outlet position.

3. The bypass device of claim 1, and further comprising:
   an inlet handle mount which is mounted on the face of the body of the bypass device, wherein the inlet handle mount includes a locking hole that aligns with a locking hole on the inlet control handle when the inlet control handle is in the metering position allowing a lock to be passed through the inlet control handle and the inlet handle mount preventing unauthorized movement of the inlet control handle; and
   an outlet handle mount which is mounted on the face of the body of the bypass device, wherein the outlet handle mount includes a locking hole that aligns with a locking hole on the outlet control handle when the outlet control handle is in the metering position allowing a lock to be passed through the outlet control handle and the outlet handle mount preventing unauthorized movement of the outlet control handle.

4. A bypass device for use in conjunction with a gas meter, the bypass device comprising:
a bypass body that defines a bypass path for gas flow, the bypass body having a gas inlet port and a gas outlet port;
an inlet ball valve in the bypass body having a rotatable inlet diverter ball positioned between a pair of polymer annular inlet valve seats, wherein the inlet diverter ball has a 90° inlet flow passage that can be oriented to allow the flow of gas from the gas inlet port into the bypass device or into a gas meter, wherein the pair of polymer annular inlet ports are positioned 180° from one another and 90° each from the gas inlet port;
an outlet ball valve in the bypass body having a rotatable outlet diverter ball positioned between a pair of polymer annular outlet valve seats wherein the outlet diverter ball has a 90° outlet flow passage that can be oriented to allow the flow of gas out of the bypass device or out of the gas meter into the gas outlet port, wherein the pair of polymer annular outlet valve seats are positioned 180° from one another and 90° each from the gas outlet port;
an inlet handle for moving the inlet diverter ball between a normal position and a bypass position; and
an outlet handle for moving the outlet diverter ball between a normal position and a bypass position;
wherein, when the inlet and outlet diverter balls are in the normal position, gas is routed through the gas meter, and when the inlet and outlet diverter balls are in the bypass position, gas is routed through the bypass path;
wherein, each of the polymer annular inlet valve seats and each of the polymer annular valve seats comprises a polytetrafluoroethylene ring having a flat rear surface with a circular center bore extending between the front surface and the rear surface, the front surface including an outer rim section, a first conical section extending radially inward from the rim section toward the center bore, and a second conical section extending radically inward from the first conical section to the center bore.

5. The bypass device of claim 4, wherein the valve seats are made of polytetrafluoroethylene.

6. The bypass device of claim 4, and further comprising:
an inlet handle mount positioned between the inlet handle and the bypass body and having rotation stops that limit rotation of the inlet handle to 90° between the normal position and the bypass position of the inlet handle, wherein the inlet handle mount includes a locking hole which aligns with a locking hole of the inlet handle when the inlet handle is in the metering position to prevent unauthorized turning of the inlet handle; and
an outlet handle mount positioned between the outlet handle and the bypass body and having rotation stops that limit rotation of the outlet handle to 90° between the normal position and the bypass position of the outlet handle, wherein the outlet handle mount includes a locking hole which aligns with a locking hole of the outlet handle when the outlet handle is in the metering position to prevent unauthorized turning of the outlet handle.

7. A bypass device comprising:
a housing having a gas inlet port, a meter inlet port, a gas outlet port, a meter outlet port, a bypass passage extending between a bypass inlet and a bypass outlet, an inlet valve chamber located between the gas inlet port, the meter inlet port and the bypass inlet, and an outlet valve chamber located between the gas outlet port, the meter outlet port, and the bypass outlet;
an inlet diverter ball positioned in the inlet valve chamber and having a 90° inlet flow passage with two openings, wherein the two openings in the inlet flow passage can be oriented to allow flow from the gas inlet port to the meter inlet port or to allow flow from the gas inlet port to the bypass inlet, wherein the meter inlet port and the bypass inlet are located 180° apart, and the gas inlet port is located 90° from each of the meter inlet port and the bypass inlet;
a first polymer annular inlet valve seat located between the inlet diverter ball and the bypass inlet and surrounding the bypass inlet;
a second polymer annular inlet valve seat located between the inlet diverter ball and a first end cap positioned in the meter inlet port and surrounding the passage in the first end cap;
an inlet control handle connected to rotate the inlet diverter ball between a meter inlet position in which the 90° inlet flow passage connects the gas inlet port and the meter inlet port, and a bypass inlet position in which the 90° inlet flow passage connects the gas inlet port and the bypass inlet;
an outlet diverter ball positioned in the outlet valve chamber and having a 90° outlet flow passage with two openings, wherein the two openings in the outlet flow passage can be oriented to allow flow from the meter outlet port to the gas outlet port or to allow flow from the bypass outlet to the gas outlet port;
a first polymer annular outlet valve seat between the outlet diverter ball and the bypass outlet;
a second polymer annular outlet valve seat between the outlet diverter ball and the meter outlet port; and
an outlet control handle connected to rotate the outlet diverter ball between a meter outlet position in which the 90° outlet flow passage connects the gas outlet port and the meter outlet port, and a bypass outlet position in which the 90° outlet flow passage connects the gas outlet port and the bypass outlet;
wherein the first and second polymer annular inlet valve seats and the first and second polymer annular outlet valve seats are made of polytetrafluoroethylene;
wherein the inlet diverter ball is engaged by and held between the first and second polymer annular inlet valve seats;
wherein the outlet diverter ball is engaged by and held between the first and second polymer annular outlet valve seats;
wherein the second polymer annular inlet valve seat is held against the inlet diverter ball by an end cap mounted in the meter inlet port; and
wherein the second polymer annular outlet valve seat is held against the outlet diverter ball by an end cap mounted in the meter outlet port; and wherein, each of the polymer annular inlet valve seats and each of the polymer annular outlet valve seats comprises a polytetrafluoroethylene ring having a flat rear surface with a circular center bore extending between the front surface and the rear surface, the front surface including an outer rim section, a first conical section extending radially inward from the rim section toward the center bore, and a second conical section extending radially inward from the first conical section to the center bore.

8. The gas bypass device of claim 7, wherein the inlet control handle is rotatable 90° in a clockwise direction from the meter inlet position to the bypass inlet position, and the outlet control handle is rotatable 90° in a counterclockwise direction from the meter outlet position to the bypass outlet position.

9. The gas bypass device of claim 7, and further comprising:
   an inlet handle mount positioned between the inlet control handle and the housing and having rotation stops that limit rotation of the inlet control handle to 90°, wherein the inlet handle mount contains a locking hole and wherein the locking holes of the inlet control handle and the inlet handle mount align when the inlet control handle is in the metering position allowing a lock to be passed through the holes to prevent unauthorized movement of the inlet control handle; and
   an outlet handle mount positioned between the outlet control handle and the housing and having rotation stops that limit rotation of the outlet control handle to 90°, wherein the outlet handle mount contains a locking hole and wherein the locking holes of the outlet control handle and the outlet handle mount align when the outlet control handle is in the metering position allowing a lock to be passed through the holes to prevent unauthorized movement of the outlet control handle.

* * * * *